United States Patent
Hsu

(10) Patent No.: US 11,777,337 B2
(45) Date of Patent: Oct. 3, 2023

(54) POWER SUPPLY SYSTEM AND CONTROL METHOD THEREOF

(71) Applicant: Wistron Corporation, New Taipei (TW)

(72) Inventor: Kuan-Wei Hsu, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 17/585,563

(22) Filed: Jan. 27, 2022

(65) Prior Publication Data
US 2023/0187965 A1    Jun. 15, 2023

(30) Foreign Application Priority Data

Dec. 10, 2021  (TW) .................. 110146310

(51) Int. Cl.
*H02J 9/00*    (2006.01)
*H02J 9/06*    (2006.01)
*H02M 3/158*   (2006.01)

(52) U.S. Cl.
CPC .............. *H02J 9/061* (2013.01); *H02J 9/00* (2013.01); *H02M 3/158* (2013.01)

(58) Field of Classification Search
CPC .. H02J 9/00; H02J 9/061; H02M 3/00; H02M 3/158
USPC ......................................................... 307/65
See application file for complete search history.

(56) References Cited

U.S. PATENT DOCUMENTS

| 8,261,102 B2 | 9/2012 | Cheng et al. |
| 8,423,806 B2 | 4/2013 | Cheng et al. |
| 2009/0271642 A1 | 10/2009 | Cheng et al. |
| 2012/0284539 A1 | 11/2012 | Cheng et al. |
| 2013/0132747 A1 | 5/2013 | Yanagawa |

(Continued)

FOREIGN PATENT DOCUMENTS

| JP | 2011229274 | 11/2011 |
| TW | I396070 | 5/2013 |
| TW | I552485 | 10/2016 |

OTHER PUBLICATIONS

"Office Action of Taiwan Counterpart Application", dated Aug. 5, 2022, p. 1-p. 11.

(Continued)

*Primary Examiner* — Jeffery S Zweizig
(74) *Attorney, Agent, or Firm* — JCIPRNET

(57) ABSTRACT

A power supply system and a control method thereof are provided. The power supply system supplies power to a load and includes a power supply device and a backup power device. The power supply device supplies power to the load through a power bus. The backup power device includes a backup battery pack, a charging converter, a discharging converter, and a processor. The charging converter and the discharging converter are coupled to the backup battery pack. The processor determines whether a status of the power battery device is a load mode or a power supply mode according to a current conversion efficiency of the power supply device. In response to the power supply mode, the processor controls the backup battery pack, so that the backup battery pack and the power supply device simultaneously supply power to the load through the power bus.

19 Claims, 7 Drawing Sheets

(56) References Cited

U.S. PATENT DOCUMENTS

2013/0221926 A1* 8/2013 Furtner ................ H02J 7/0019
320/128
2017/0093206 A1* 3/2017 Lai ........................ H02J 7/0068

OTHER PUBLICATIONS

"Office Action of Europe Counterpart Application", dated Nov. 25, 2022, pp. 1-8.
"Search Report of Europe Counterpart Application", dated Sep. 2, 2022, p. 1-p. 4.

* cited by examiner

POWER SUPPLY SYSTEM AND CONTROL METHOD THEREOF

CROSS-REFERENCE TO RELATED APPLICATION

This application claims the priority benefit of Taiwanese application no. 110146310, filed on Dec. 10, 2021. The entirety of the above-mentioned patent application is hereby incorporated by reference herein and made a part of this specification.

BACKGROUND

Technical Field

The disclosure relates to a power management technology. Particularly, the disclosure relates to a power supply system adapted for a data center and a control method thereof.

Description of Related Art

With the vigorous development of network and cloud services, data centers have become common solutions for cloud computing, network service businesses and operations. A data center typically has computing server racks configured to provide data processing and data storage functions, telecommunication and network equipment (e.g., switches and routers) for communication transmission, and power supply equipment. Therefore, the power supply equipment of the data center is often provided with a backup power system, such as a power supply unit (PSU), an uninterrupted power system (UPS), or a power generator so as to avoid the shutdown of the data center.

After the design of the data center or the power supply equipment having a plurality of computing servers is completed, an efficiency line of the power supply equipment is then fixed. However, since the used times and loads of the computing server racks are not completely the same, it is difficult to maintain the data center at a relatively high load efficiency, thus reducing the power conversion efficiency. Therefore, how to effectively manage power of the data center to thus save power consumption without power failure of the data center is one of the research directions.

SUMMARY

The disclosure provides a power supply system and a control method thereof, in which power management allows a power supply device that controls the power supply system to be positioned at a load point with a relatively high conversion efficiency as much as possible to obtain the optimal energy use efficiency.

An embodiment of the disclosure provides a power supply system configured to supply power to a load. The power supply system includes a power supply device and a backup power device. The power supply device supplies power to the load. The backup power device includes a backup battery pack, a charging converter, a discharging converter, and a processor. The charging converter is coupled to the backup battery pack. The discharging converter is coupled to the backup battery pack. The processor is coupled to the power supply device, the backup battery pack, the charging converter, and the discharging converter. The processor determines whether a status of the backup power device is a load mode or a power supply mode according to a current conversion efficiency of the power supply device. In response to the power supply mode, the processor controls the backup battery pack, such that the backup battery pack and the power supply device simultaneously supply power to the load.

An embodiment of the disclosure provides a control method of a power supply system. The power supply system is configured to supply power to a load. The control method includes the following. It is determined whether a status of a backup power device is a load mode or a power supply mode according to a current conversion efficiency of a power supply device. The power supply system includes the power supply device and the backup power device. In response to the power supply mode, a backup battery pack of the backup power device is controlled, such that the backup battery pack and the power supply device simultaneously supply power to the load.

An embodiment of the disclosure provides a power supply system, which includes a power supply device and a backup power device. The power supply device is configured to supply power through a power bus. The backup power device includes a backup battery pack, a power converter, and a processor. The power converter is coupled to the backup battery pack and the power bus. The processor is coupled to the power supply device, the backup battery pack, and the power converter. The processor controls the backup battery pack and the power converter according to a current conversion efficiency of the power supply device, such that the backup battery pack performs switching to a charge mode or a discharge mode through the power converter.

Based on the foregoing, in the power supply system and the control method thereof described in the embodiments of the disclosure, the load of the power supply device is controlled by charging or discharging of the backup power device, so that the load of the power supply device is positioned at a load point with a relatively high conversion efficiency as much as possible. In other words, in the embodiments of the disclosure, it is determined whether the status of the backup power device is a load mode or a power supply mode. When the status of the backup power device is the load mode, the backup power device is charged to maintain the power supply device at a load point with a relatively high conversion efficiency. In addition, when the status of the backup power device is the power supply mode, the backup power device is made to supply power to the computing server to share the load of the power supply device. The power supply device is maintained at a load point with a relatively high conversion efficiency, thus the optimal energy use efficiency is obtained.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
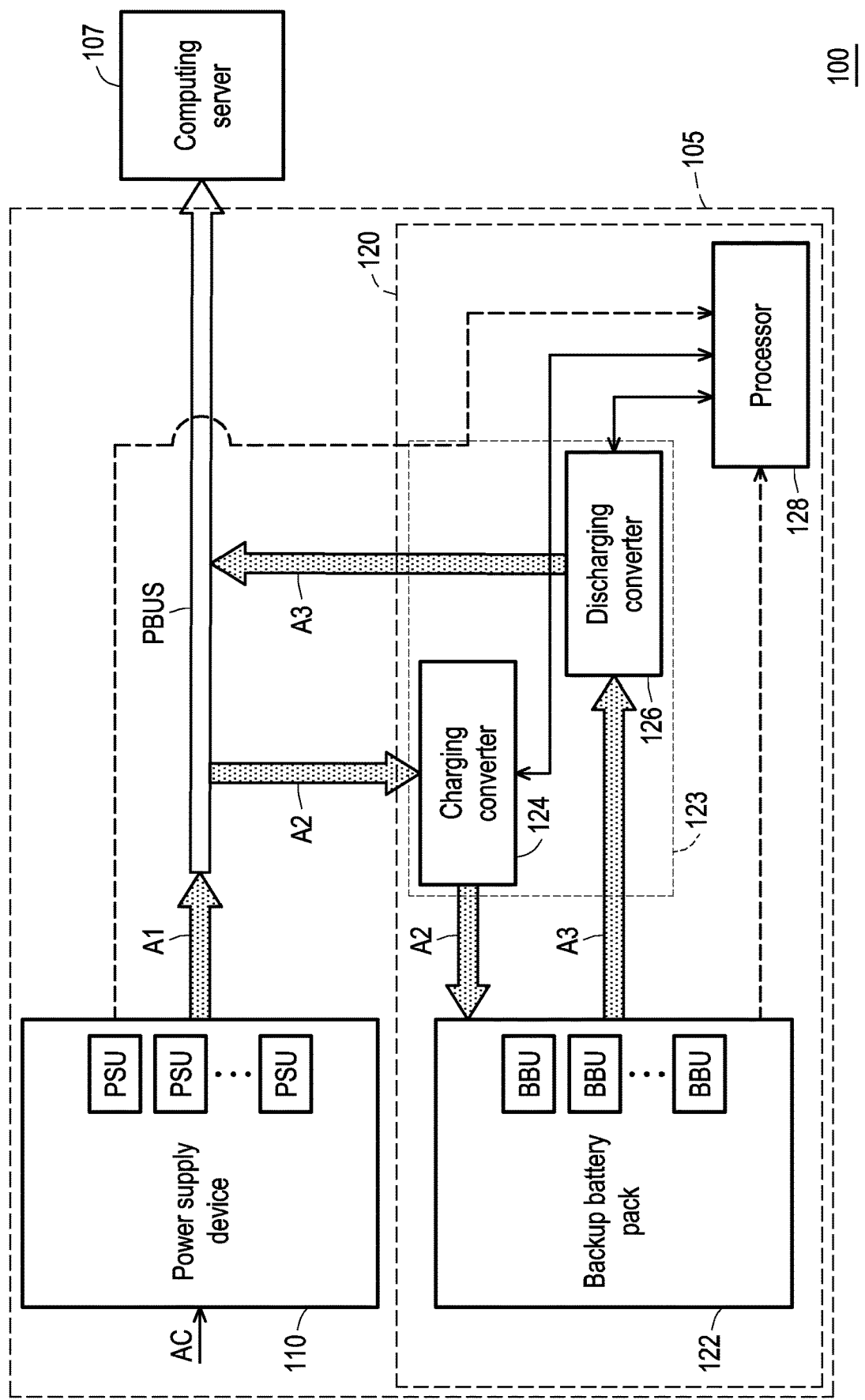
FIG. 1 is a block diagram of a data center according to an embodiment of the disclosure.

FIG. 1 is a block diagram of a data center 100 according to an embodiment of the disclosure. The data center 100 mainly includes a power supply system 105 and a load. The load referred to in this embodiment may include at least one computing server 107. In other words, the power supply system 105 of this embodiment is mainly applied to the data center 100 to supply power to the computing server 107 of the data center 100, but it is not limited to this.

The power supply system 105 mainly includes a power supply device 110 and a backup power device 120. Utilizing AC power or other power supplies, the power supply device 110 supplies power to the at least one computing server 107 of the data center 100 through a power bus PBUS (as indicated by arrow A1). The power supply device 110 of this embodiment may also have a plurality of power supply units (PSU) PSU to serve as a backup for the power supply device 110. In this embodiment, the computing server 107 of the data center 100 is formed by a plurality of computers or servers connected to each other to serve as the main load of the data center 100.

The backup power device 120 includes a backup battery pack 122, a power converter 123, and a processor 128. In an embodiment, the power converter 123 is coupled to the backup battery pack 122 and the power bus PBUS. The power converter 123 includes a charging converter 124 and a discharging converter 126. The charging converter 124 is coupled to the backup battery pack 122 and the power bus PBUS, and the charging converter 124 is indirectly coupled to the power supply device 110 through the power bus PBUS. The discharging converter 126 is coupled to the backup battery pack 122 and the power bus PBUS, and the discharging converter 126 is indirectly coupled to the computing server 107 through the power bus PBUS. The charging converter 124 and the discharging converter 126 are each coupled between the backup battery pack 122 and the power bus PBUS.

The charging converter 124 and the discharging converter 126 of this embodiment are implemented by a DC/DC converter with a constant current (CC)/constant voltage (CV) mode. To be specific, the charging converter 124 is configured to provide power from the power bus PBUS to the backup battery pack 122 (as indicated by arrow A2) to charge the backup battery pack 122. The discharging converter 126 is configured to provide power stored in the backup battery pack 122 through the power bus PBUS to the computing server 107 (as indicated by arrow A3) to discharge the backup battery pack 122. Therefore, the backup power device 120 of this embodiment may not only serve as the load of the data center 100 but also serve as the power supply of the data center 100. The backup power device 120 controls the current in the power bus PBUS to make it controllable by using the DC-to-DC converter with a CC/CV mode.

The backup battery pack 122 of this embodiment may have a plurality of backup battery units (BBU) BBU. The processor 128 may control the backup battery units BBU in the backup battery pack 122 to be selectively charged or discharged. For example, the processor 128 does not need to charge the backup battery units BBU at the same time and may selectively charge one or N of the backup battery units BBU in the backup battery pack 122, and then correspondingly increases the load of the power supply device by adjusting the number of backup battery units BBU to be charged. The processor 128 does not need to discharge the backup battery units BBU at the same time and may selectively discharge one or N of the backup battery units BBU to supply power to the computing server 107, and then correspondingly reduces the load of the power supply device. In addition, the processor 128 may discharge the fully charged backup battery units BBU in priority, thus releasing power.

The processor 128 is coupled to the power supply device 110, the backup battery pack 122, the charging converter 124, and the discharging converter 126. The processor determines whether a status of the backup power device 120 is a load mode or a power supply mode according to a current conversion efficiency of the power supply device 110. From another perspective according to the embodiment of the disclosure, the processor 128 controls the backup battery pack 122 and the power converter 123 according to the current conversion efficiency of the power supply device 110, so that the backup battery pack 122 performs switching to a charge mode or a discharge mode through the power converter 123. If the processor 128 determines that the status of the backup power device 120 is the power supply mode (i.e., the processor 128 causes the backup battery pack 122 to perform switching to the discharge mode through the power converter 123), the processor 128 controls the backup battery pack 122 to supply power to the power bus PBUS through the discharging converter 126, so that the backup battery pack 122 and the power supply device 110 simultaneously supply power to the computing server 107 of the data center 100. In addition, if the processor 128 determines that the status of the backup power device 120 is the load mode (i.e., the processor 128 causes the backup battery pack 122 to perform switching to the charge mode through the power converter 123), the processor 128 controls the backup battery pack 122 to be charged through the power bus PBUS, so that the power supply device 110 charges the backup battery pack 122 while supplying power to the computing server 107 of the data center 100.

Figure 2:
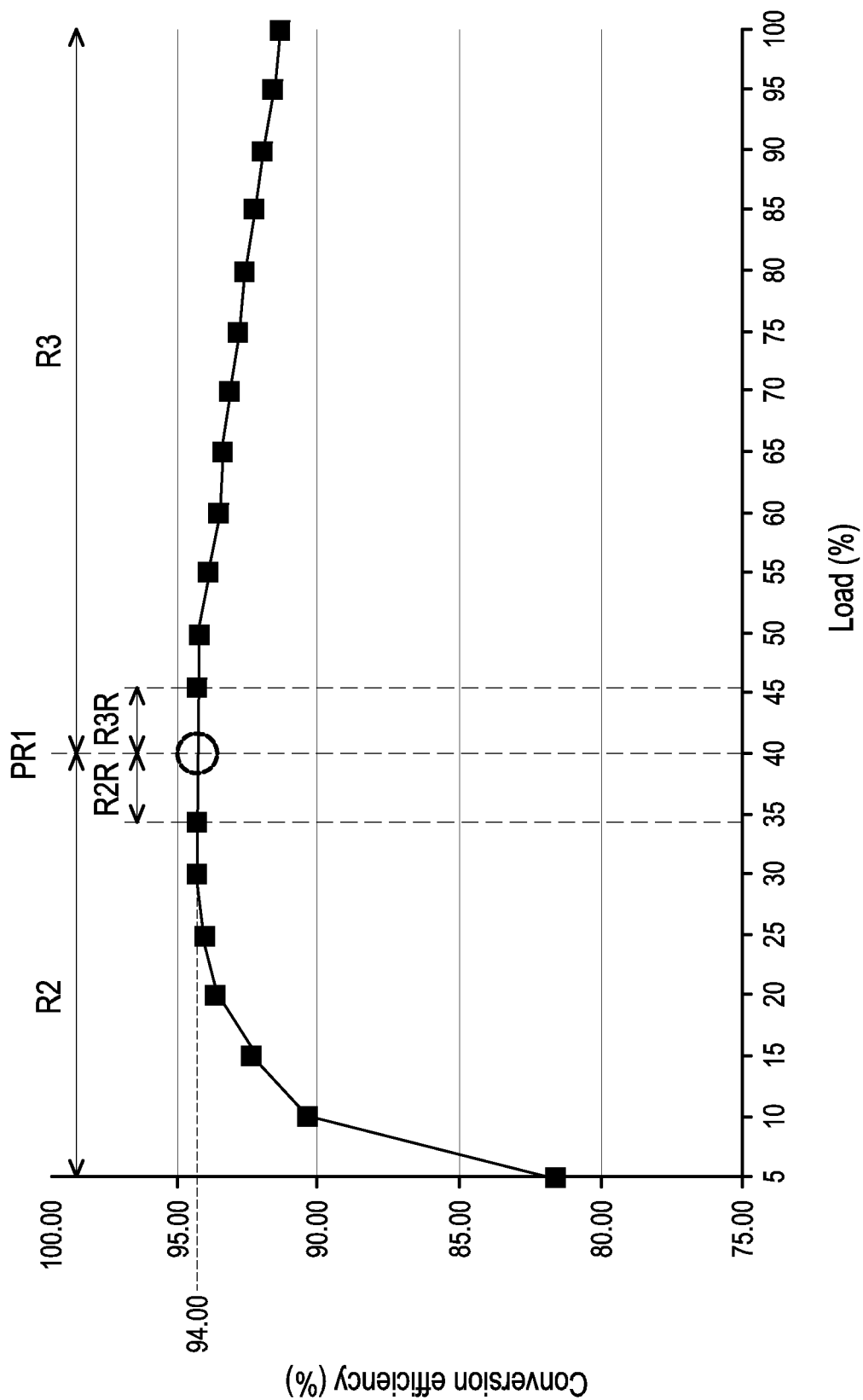
FIG. 2 is a line chart of an efficiency of a power supply device according to an embodiment of the disclosure.

It is herein described how to determine whether the status of the backup power device 120 is the load mode (i.e., the backup battery pack 122 caused to perform switching to the charge mode) or the power supply mode (i.e., the backup battery pack 122 caused to perform switching to the discharge mode) according to the current conversion efficiency of the power supply device 110. The above description of "the backup battery pack 122 caused to perform switching to the charge mode" may also be referred to as the backup battery pack 122 switched to the charge mode and performing the charge mode; and the above description of "the backup battery pack 122 caused to perform switching to the discharge mode" may also be referred to as the backup battery pack 122 switched to the discharge mode and performing the discharge mode. FIG. 2 is a line chart of an efficiency of the power supply device 110 according to an embodiment of the disclosure. For example, this embodiment is designed so that the power supply device 110 provides 1600 watts of power, and its efficiency line is composed of a plurality of conversion efficiency points as shown in FIG. 2. The horizontal axis of FIG. 2 presents the load of the power supply device 110 (presented as a percentage (%)), and the vertical axis presents the conversion efficiency of the power supply device 110 for power (presented as a percentage (%)). In FIG. 2, a conversion efficiency point PR1 of the power supply device 110 is the optimal conversion efficiency point (a conversion efficiency of about 94%) of the power supply device 110. At this time, the optimal conversion efficiency point PR1 corresponds to a 40% load of the power supply device 110. Intervals R2R and R3R that are close to the conversion efficiency point PR1 are line segments composed of other conversion efficiency points that are approximate to the optimal conversion efficiency point of 94%.

A conversion efficiency interval R2 of the power supply device 110 is a light load interval (a load between about 0% and 40% of the power supply device 110) of the power supply device 110. At this time, the conversion efficiency of power is relatively low, increasing from a conversion efficiency of about 82% corresponding to a load of 5% to a conversion efficiency of about 94% corresponding to a load of 40%. At this time, if it is intended that the power supply device 110 enters the optimal conversion efficiency point PR1, then the status of the backup power device 120 may be set to the load mode. That is, the backup battery pack 122 may be switched to the charge mode to increase the load of the power supply device 110 so that the conversion efficiency approaches the optimal conversion efficiency point PR1. Therefore, the conversion efficiency interval R2 of the power supply device 110 is also the load mode of the backup power device 120. According to some embodiments of the disclosure, since the conversion efficiency points in the intervals R2R and R3R are also approximate to the optimal conversion efficiency point PR1, those applying this embodiment may also accordingly set the status of the backup power device 120 to the load mode (to cause the backup battery pack 122 to perform switching to the charge mode), so that the conversion efficiency of the power supply device 110 enters the intervals R2R and R3R corresponding to the conversion efficiency point PR1. As such, the current conversion efficiency of the power supply device 110 may be determined according to the conversion efficiency intervals R2R and R3R corresponding to the conversion efficiency point PR1.

A conversion efficiency interval R3 of the power supply device 110 is an overload interval (a load of about 40% to 100%) of the power supply device 110. At this time, the conversion efficiency of power is gradually reduced from a conversion efficiency of 94% corresponding to a load of 40% to be close to a conversion efficiency of 90% corresponding to a load of 100%. At this time, if it is intended that the power supply device 110 enters the optimal conversion efficiency point PR1, then the status of the backup power device 120 may be set to the power supply mode. That is, the backup battery pack 122 may be switched to the discharge mode to reduce the load of the power supply device 110. Therefore, the conversion efficiency interval R3 of the power supply device 110 is also the power supply mode of the backup power device 120. According to some embodiments of the disclosure, since the conversion efficiency points in the intervals R2R and R3R are also approximate to the optimal conversion efficiency point PR1, those applying this embodiment may also accordingly set the status of the backup power device 120 to the power supply mode (to cause the backup battery pack 122 to perform switching to the discharge mode), so that the conversion efficiency of the power supply device 110 enters the intervals R2R and R3R.

In other words, after the design of the power supply device 110 in FIG. 1 is completed, the efficiency line of the power supply device 110 in FIG. 2 is then fixed. Therefore, the efficiency line may be obtained by measuring efficiency by an efficiency measuring instrument at each load point and then recording each conversion efficiency point in FIG. 2. In addition, the optimal conversion efficiency point PR1 and the intervals R2R and R3R may be obtained from the efficiency line. The processor 128 obtains the conversion efficiency point PR1 of the power supply device 110, and determines the current conversion efficiency of the power supply device 110 according to the conversion efficiency point PR1 to determine whether a status of the power supply device 110 is a load mode or a power supply mode. Those applying this embodiment may also determine the current conversion efficiency of the power supply device 110 according to the intervals R2R and R3R to determine whether the status of the power supply device 110 is the load mode or the power supply mode. In other words, the processor 128 obtains the conversion efficiency point PR1 of the power supply device 110 and determines the current conversion efficiency of the power supply device 110 according to the conversion efficiency point PR1, so that the backup battery pack 122 performs switching to the charge mode or the discharge mode through the power converter 123. Those applying this embodiment may also determine the current conversion efficiency of the power supply device 110 according to the intervals R2R and R3R, so that the backup battery pack 122 performs switching to the charge mode or the discharge mode through the power converter 123.

To be specific, the processor 128 in FIG. 1 communicates with the computing server 107 to obtain the efficiency line from the computing server 107 and obtain the optimal conversion efficiency point PR1 of the power supply device 110, and sets a preset load electricity characteristic value PVdc. The nature of the preset load electricity characteristic value PVdc may be a preset voltage value, electric current value, or resistance value. Those applying this embodiment may adjust the nature of the preset load electricity characteristic value depending on the requirements or the settings of the hardware circuit in the processor 128. The preset load electricity characteristic value PVdc of this embodiment is a voltage value.

The processor 128 in FIG. 1 also obtains a current load electricity characteristic value from the power supply device 110. In this embodiment, the power supply device 110 provides a current electric current value Imon corresponding to the load of the power supply device 110, and the processor 128 in FIG. 1 obtains a current load electricity characteristic value Vimon of the power supply device 110 by the current electric current value Imon. The current load electricity characteristic value Vimon of this embodiment is a voltage value to be accordingly compared with the preset load electricity characteristic value PVdc. The processor 128 in FIG. 1 compares the preset load electricity characteristic value PVdc and the current load electricity characteristic value Vimon to determine the load of the power supply device 110 so as to determine whether the status of the backup power device 120 is the load mode or the power supply mode. In other words, the processor 128 in FIG. 1 compares the preset load electricity characteristic value PVdc and the current load electricity characteristic value Vimon to determine the load of the power supply device 110 so as to cause the backup battery pack 122 to perform switching to the charge mode or the discharge mode through the power converter 123.

It is assumed here that when the power supply device 110 is at a load of 100%, the current load electricity characteristic value Vimon is 8V and may be presented linearly. For example, a load of 20% indicates that the load electricity characteristic value Vimon is 1.6V. Therefore, if it is intended to take a load of 50% of the power supply device 110 as the basis for determining the load mode or the power supply mode of the backup power device 120, the preset load electricity characteristic value PVdc is set to 4V.

Figure 3:
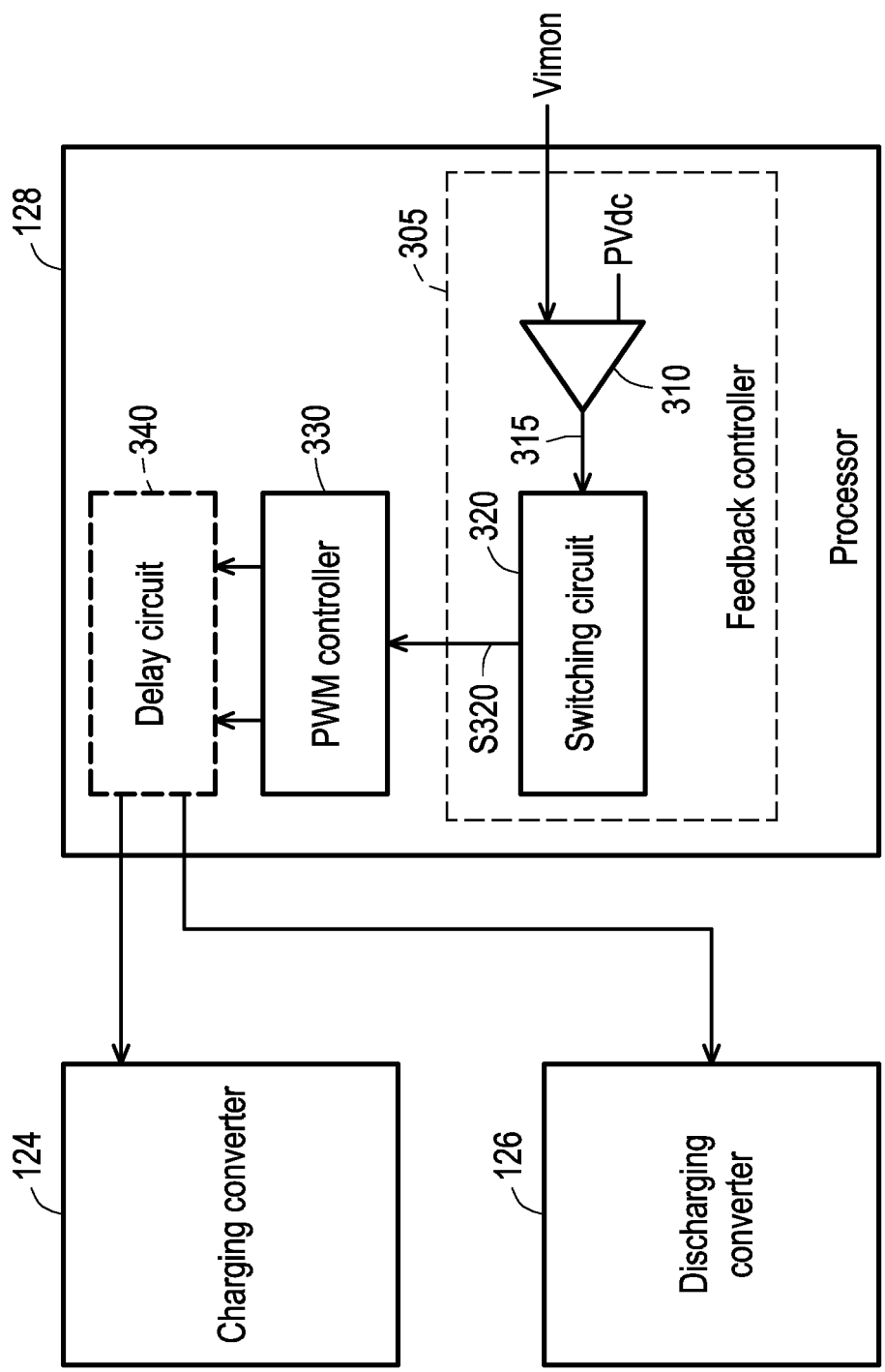
FIG. 3 is a detailed circuit block diagram of the processor in FIG. 1.

FIG. 3 is a detailed circuit block diagram of the processor 128 in FIG. 1. The processor 128 mainly includes a comparator 310, a switching circuit 320, and a pulse width modulation (PWM) controller 330. The processor 128 also includes a delay circuit 340. The comparator 310 and the switching circuit 320 are configured in a feedback controller 305 of the processor 128. A first input terminal of the comparator 310 is configured to receive the preset load electricity characteristic value PVdc. A second input terminal of the comparator 310 is coupled to the power supply device 110 and configured to receive the current load electricity characteristic value Vimon of the power supply device 110. An output terminal of the comparator 310 generates a comparison result 315 by comparing the voltage values of the current load electricity characteristic value Vimon and the preset load electricity characteristic value PVdc. An input terminal of the switching circuit 320 is coupled to the comparator 310 and configured to receive the comparison result 315 generated by the comparator 310. The switching circuit 320 generates a switching signal S320 according to the comparison result 315.

The PWM controller 330 is coupled to the switching circuit 320, the charging converter 124, and the discharging converter 126. The PWM controller 330 generates at least one pulse signal to the charging converter 124 and the discharging converter 126 according to the switching signal S320, to thus selectively activate one of the charging converter 124 and the discharging converter 126. When the charging converter 124 is operating (turned on), the discharging converter 126 is not operating (turned off). On the contrary, when the charging converter 124 is not operating (turned off), the discharging converter 126 is operating (turned on). In addition, those applying this embodiment may design so that the PWM controller 330 is indirectly coupled to the charging converter 124 and the discharging converter 126 through the delay circuit 340, and the delay circuit 340 may be added according to the signal transmission between the PWM controller 330, the charging converter 124, and the discharging converter 126, so as to adjust the current supply response speed on the power bus PBUS for signals to be transmitted smoothly.

Figure 4:
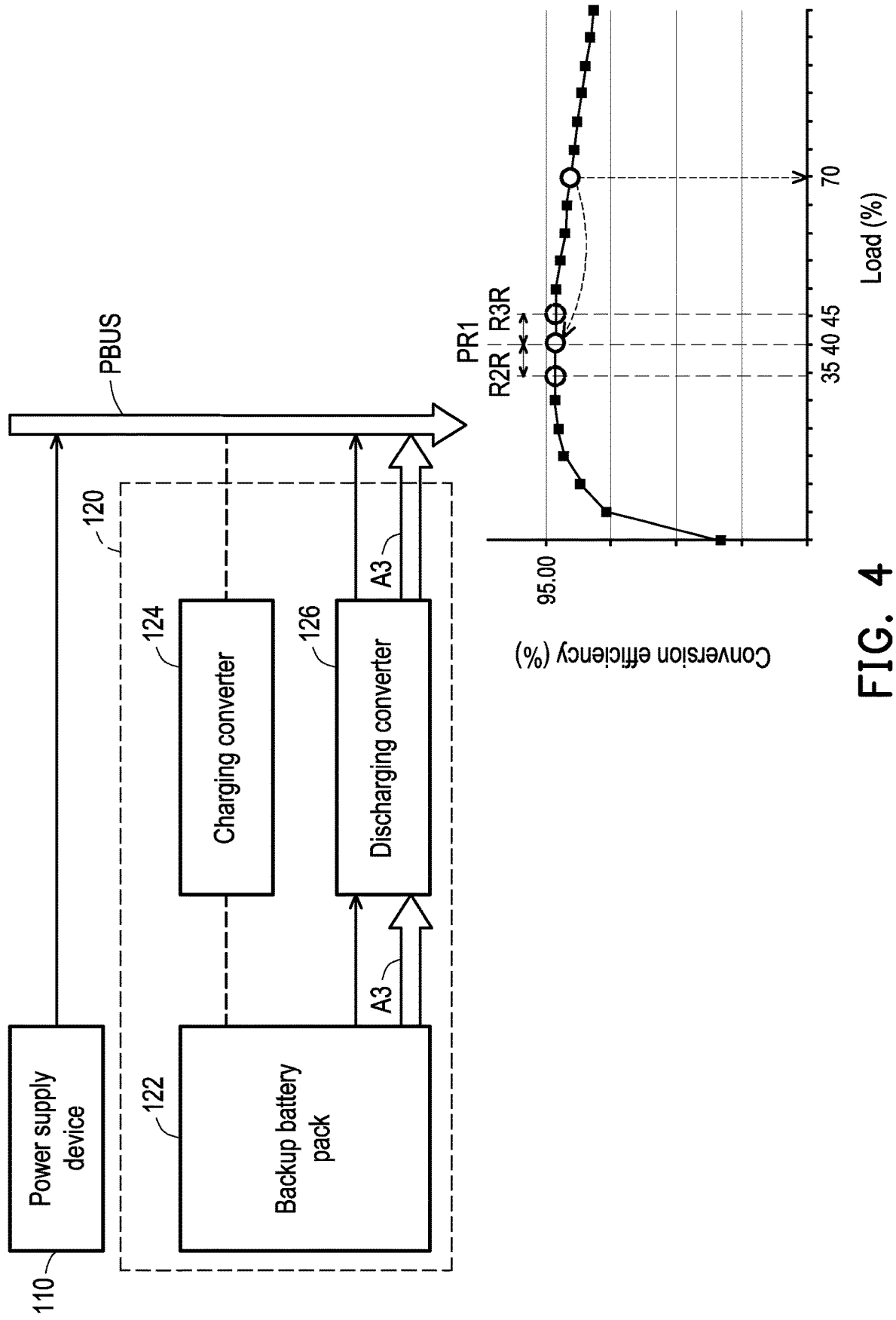
FIG. 4 and FIG. 5 are respectively schematic diagrams of the power supply mode and the load mode of the backup power device corresponding to a power supply device and a power bus according to an embodiment of the disclosure.
Figure 5:
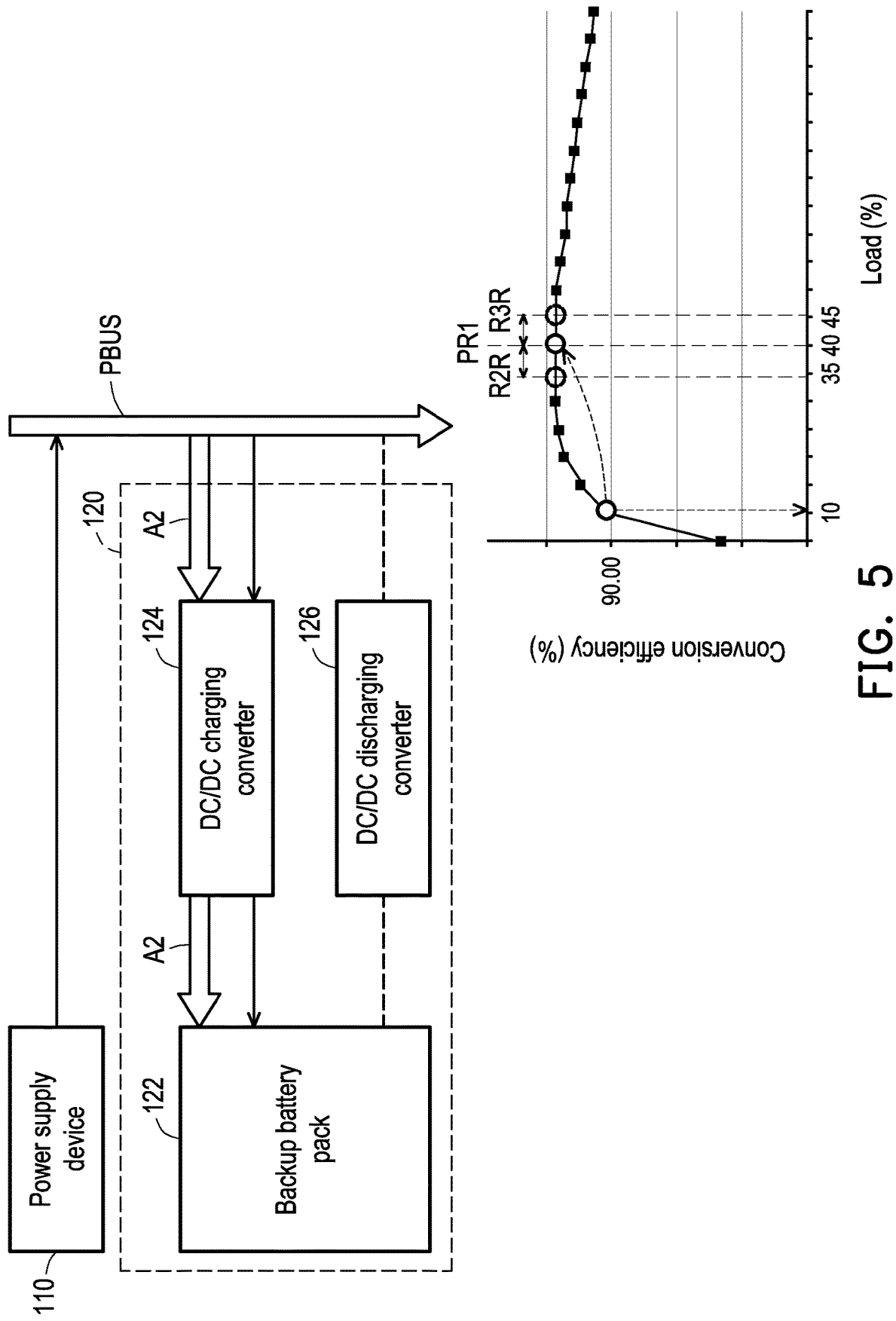

FIG. 4 and FIG. 5 are respectively schematic diagrams of the power supply mode (i.e., the discharge mode of the backup battery pack 122) and the load mode (i.e., the charge mode of the backup battery pack 122) of the backup power device 120 corresponding to the power supply device 110 and the power bus PBUS according to an embodiment of the disclosure. For example, with reference to FIG. 3 and FIG. 4 together, it is known that the highest efficiency point PR1 is at a load of 40% and the load of 40% linearly corresponds to a load electricity characteristic value of 3.2V, then the preset load electricity characteristic value PVdc may be set to 3.2V, but not limited thereto. If the status of the backup power device 120 in FIG. 1 is the power supply mode (e.g., the power supply device 110 is at a load of 70%), the current load electricity characteristic value Vimon of the power supply device 110 obtained by the processor 128 in FIG. 1 should be greater than 4V (here assumed to be linearly presented as 5.6V), the comparator 310 in the processor 128 generates the comparison result 315 corresponding to the power supply mode, and the switching circuit 320 also generates a comparison signal S320 corresponding to the power supply mode. In response to the power supply mode, the PWM controller 330 of the processor 128 controls the discharging converter 126 and disables the charging converter 124, as shown in FIG. 1, so that the backup battery pack 122 supplies power to the power bus PBUS (as indicated by arrow A3). The processor 128 in FIG. 1 causes the backup battery pack 122 to perform switching to the discharge mode through the power converter 123. In other words, at this time, the backup battery pack 122 supplies power through the power bus PBUS, and the power of the backup battery pack 122 is converted by the discharging converter 126. Since the power bus PBUS has the power provided by both the power supply device 110 and the backup battery pack 122 to the load (including the computing server 107), the load of the power supply device 110 may accordingly be reduced from a load of 70% to about 40%, so that the load of the power supply device 110 is positioned at the optimal conversion efficiency point PR1 of FIG. 2.

With reference to FIG. 3 and FIG. 5 together, for example, if the status of the backup power device 120 in FIG. 1 is the load mode (e.g., the power supply device 110 is at a load of 10%), the current load electricity characteristic value Vimon of the power supply device 110 obtained by the processor 128 in FIG. 1 should be less than 4V (here assumed to be linearly presented as 0.8V), but not limited thereto. The comparator 310 in the processor 128 in FIG. 1 generates the comparison result 315 corresponding to the load mode, and the switching circuit 320 also generates the comparison signal S320 corresponding to the load mode. In response to the load mode, the processor 128 controls the charging converter 124 and disables the discharging converter 126, as shown in FIG. 1, the charging converter 124 converts the power of the power supply device 110, and the backup battery pack 122 then receives the converted power by the charging converter 124 through the power bus PBUS to be charged (as indicated by arrow A2). The processor 128 in FIG. 1 causes the backup battery pack 122 to perform switching to the charge mode through the power converter 123. Since the backup battery pack 122 is charged by a part of the power provided by the power supply device 110 to the power bus PBUS, while another part of the power provided by the power supply device 110 to the power bus PBUS is configured to supply power to the load (including the computing server 107), which increases the power consumption of the power supply device 110, the load of the power supply device 110 is increased from a load of 10% to about 40%, so that the load of the power supply device 110 is positioned at the optimal conversion efficiency point PR1 of FIG. 2.

In particular, in response to the load mode and the backup battery pack 122 in the backup power device 120 in FIG. 1 being in a fully charged state, the processor 128 does not charge the backup battery pack 122 through the power bus PBUS, so as to prevent overcharging the backup battery units BBU in the backup battery pack 122. In addition, in response to the power supply mode and the backup battery pack 122 in the backup power device 120 in FIG. 1 being in a state of low level charge (i.e., a state of low charge), the processor 128 does not discharge the power bus PBUS through the backup battery pack 122, so as to prevent a low charge of the backup battery pack 122 being insufficient to provide adequate power energy to the computing server 107.

Figure 6A:
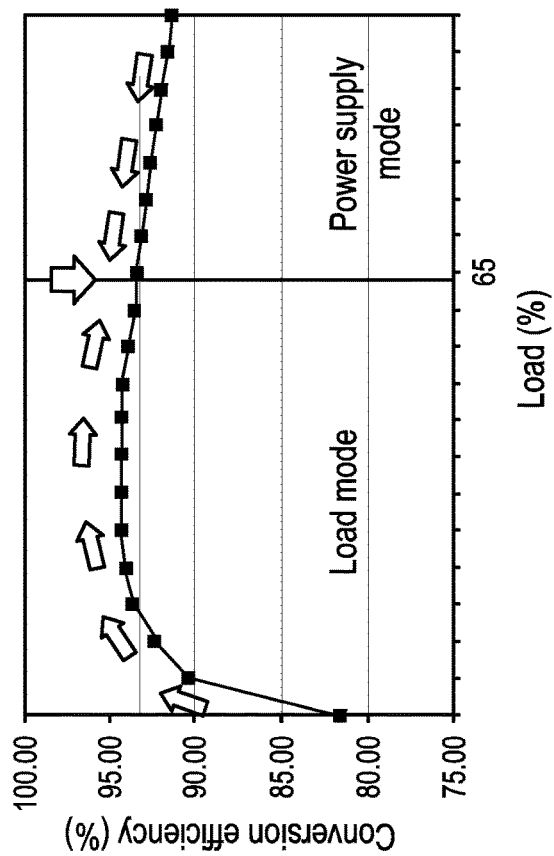
FIG. 6A and FIG. 6B are line charts illustrating efficiencies of a plurality of power supply devices according to an embodiment of the disclosure.
Figure 6B:
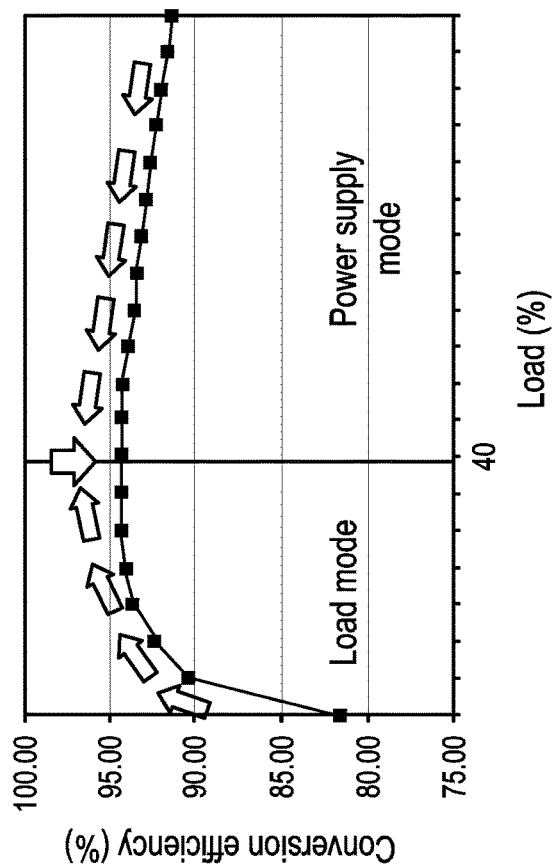

FIG. 6A and FIG. 6B are line charts illustrating efficiencies of a plurality of power supply devices 110 according to an embodiment of the disclosure. Similar to FIG. 2, for example, in FIG. 6A, a load of about 40% is taken as the preset load electricity characteristic value, and it is accordingly determined whether the status of the backup power device is the load mode or the power supply mode. In addition, in FIG. 6B, a load of about 65% is taken as the preset load electricity characteristic value, and it is accordingly determined whether the status of the backup power device is the load mode or the power supply mode. Nonetheless, the disclosure is not limited thereto. Therefore, those applying this embodiment may adjust the conversion efficiency point PR1 (e.g., a load of 40% in FIG. 6A and a load of 65% in FIG. 6B) as required. The optimal conversion efficiency interval for the power supply device 110 is not necessarily taken as the standard basis for the conversion efficiency point PR1.

Figure 7:
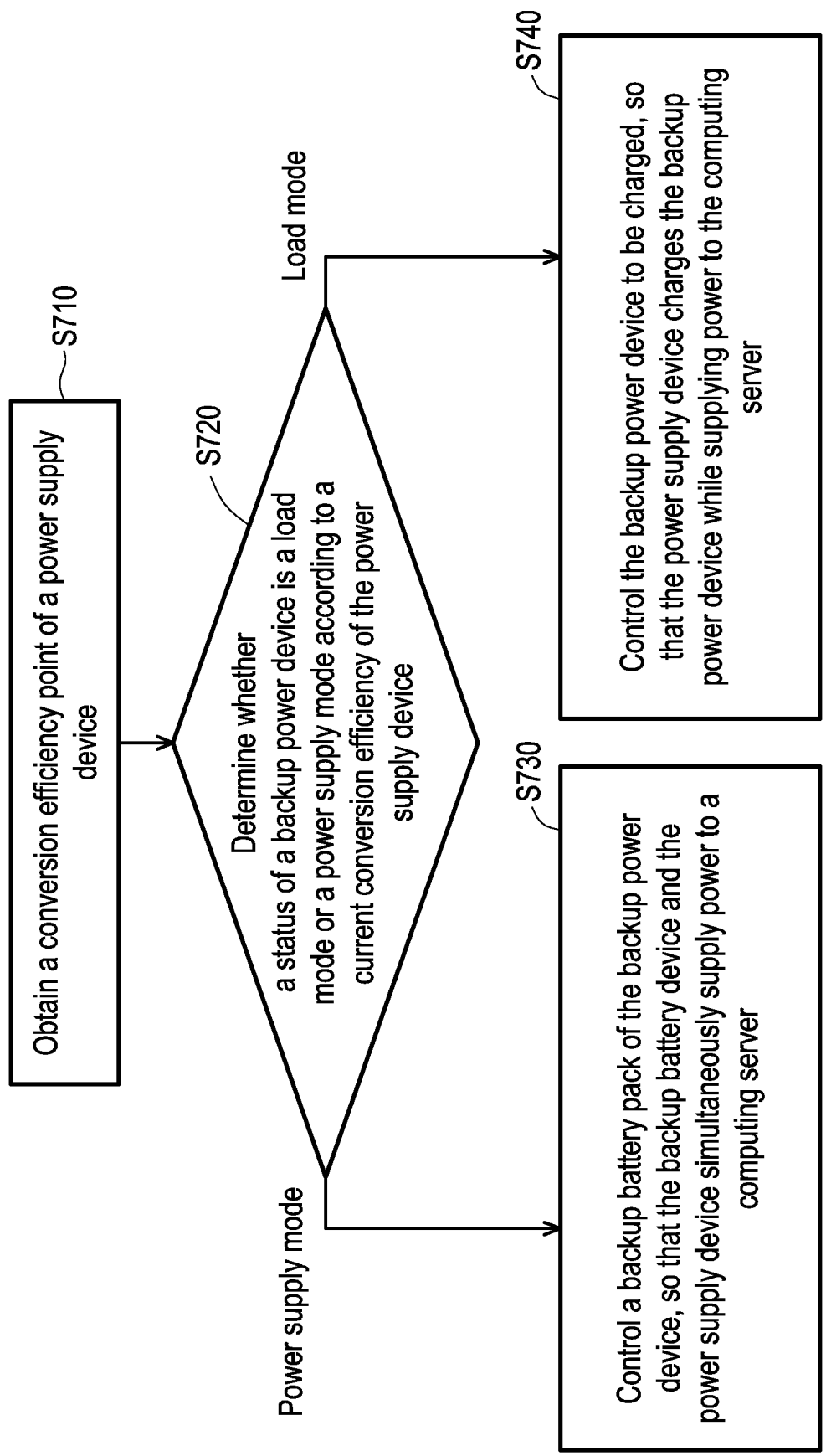
FIG. 7 is a flowchart of a control method of a power supply system according to an embodiment of the disclosure.

FIG. 7 is a flowchart of a control method of a power supply system according to an embodiment of the disclosure. The control method is applied to the data center 100 of FIG. 1. The data center 100 includes the power supply system 105. The power supply system 105 includes the power supply device 110 and the backup power device 120. The power supply system 105 is configured to supply power to a load. The load may include the at least one computing server 107. In step S710, the processor 128 in FIG. 1 obtains a current conversion efficiency of the power supply device 110. In step S720, the processor 128 in FIG. 1 determines whether a status of the backup power device 120 is a load mode or a power supply mode according to the current conversion efficiency of the power supply device 110. In step S730, in response to the power supply mode, the processor 128 in FIG. 1 controls the backup battery pack 122 of the backup power device 120, so that the backup power device 120 and the power supply device 110 simultaneously supply power to the computing server 107 of the data center 100. In step S740, in response to the load mode, the processor 128 in FIG. 1 controls the backup power device 120 to be charged, so that the power supply device 110 charges the backup power device 120 while supplying power to the computing server 107 of the data center 100. For the specific flows and details of the control method in FIG. 7, reference may be made to the above embodiments.

In summary of the foregoing, in the power supply system and the control method thereof described in the embodiments of the disclosure, the load of the power supply device is controlled by charging or discharging of the backup power device, so that the load of the power supply device is positioned at a load point with a relatively high conversion efficiency as much as possible. In other words, in the embodiments of the disclosure, it is determined whether the status of the backup power device is a load mode or a power supply mode. When the status of the backup power device is the load mode, the backup power device is charged to maintain the power supply device at a load point with a relatively high conversion efficiency. In addition, when the status of the backup power device is the power supply mode, the backup power device is made to supply power to the computing server to share the load of the power supply device, maintaining the power supply device at a load point with a relatively high conversion efficiency, thus obtaining the optimal energy use efficiency.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power supply system configured to supply power to a load, the power supply system comprising:
   a power supply device supplying power to the load; and
   a backup power device comprising:
      a backup battery pack;
      a charging converter coupled to the backup battery pack;
      a discharging converter coupled to the backup battery pack; and
      a processor coupled to the power supply device, the backup battery pack, the charging converter, and the discharging converter,
   wherein the processor determines whether a status of the backup power device is a load mode or a power supply mode according to a current conversion efficiency of the power supply device, and
   wherein in response to the power supply mode, the processor controls the backup battery pack, such that the backup battery pack and the power supply device simultaneously supply power to the load.

2. The power supply system according to claim 1, wherein in response to the load mode, the processor controls the backup battery pack to be charged, such that the power supply device charges the backup battery pack while supplying power to the load.

3. The power supply system according to claim 1, wherein the processor obtains a conversion efficiency point of the power supply device and determines the current conversion efficiency of the power supply device according to the conversion efficiency point so as to determine whether the status of the backup power device is the load mode or the power supply mode.

4. The power supply system according to claim 3, wherein the processor sets a preset load electricity characteristic value according to the conversion efficiency point of the power supply device, obtains a current load electricity characteristic value corresponding to the power supply device, and compares the preset load electricity characteristic value and the current load electricity characteristic value to determine whether the status of the backup power device is the load mode or the power supply mode.

5. The power supply system according to claim 4, wherein the processor comprises:
   a comparator, wherein a first input terminal of the comparator is configured to receive the preset load electricity characteristic value, a second input terminal of the comparator is configured to receive the current load electricity characteristic value of the power supply device, and an output terminal of the comparator generates a comparison result;
   a switching circuit, wherein an input terminal of the switching circuit is coupled to the output terminal of the comparator, and the switching circuit generates a switching signal according to the comparison result; and
   a pulse width modulation controller coupled to the switching circuit and generating at least one pulse signal to the charging converter and the discharging converter according to the switching signal to selectively enabling one of the charging converter and the discharging converter.

6. The power supply system according to claim 3, wherein in response to the power supply mode, the processor controls the discharging converter and disables the charging converter, such that the backup battery pack supplies power through a power bus, and the load of the power supply device is positioned at the conversion efficiency point, and
in response to the load mode, the processor controls the charging converter and disables the discharging converter, such that the backup battery pack is charged from a power bus, and the load of the power supply device is positioned at the conversion efficiency point,
wherein in response to the load mode and the backup battery pack being in a fully charged state, the processor does not charge the backup battery pack through the power bus.

7. The power supply system according to claim 6, wherein in response to the load mode, the backup battery pack is in a state of charge, and the processor stops the backup battery pack from discharging through the power bus.

8. The power supply system according to claim 1, wherein the processor obtains a conversion efficiency point of the power supply device and determines the current conversion efficiency of the power supply device according to a conversion efficiency interval corresponding to the conversion efficiency point so as to determine whether the status of the backup power device is the load mode or the power supply mode.

9. A control method of a power supply system, wherein the power supply system is configured to supply power to a load, and the control method comprises:
determining whether a status of a backup power device is a load mode or a power supply mode according to a current conversion efficiency of a power supply device, wherein the power supply system comprises the power supply device and the backup power device; and
in response to the power supply mode, controlling a backup battery pack of the backup power device, such that the backup battery pack and the power supply device simultaneously supply power to the load.

10. The control method according to claim 9, further comprising:
in response to the load mode, controlling the backup power device to be charged, such that the power supply device charges the backup power device while supplying power to the load.

11. The control method according to claim 9, wherein the step of determining whether the status of the backup power device is the load mode or the power supply mode according to the current conversion efficiency of the power supply device comprises:
obtaining a conversion efficiency point of the power supply device;
determining the current conversion efficiency of the power supply device according to the conversion efficiency point; and
determining whether the status of the backup power device is the load mode or the power supply mode.

12. The control method according to claim 9, further comprising:
in response to the status of the backup power device being the load mode and the backup battery pack being in a fully charged state, not charging the backup power device.

13. The control method according to claim 9, further comprising:
in response to the status of the backup power device being the load mode and the backup battery pack being in a state of charge, stopping the backup battery pack from discharging.

14. A power supply system, comprising:
a power supply device configured to supply power through a power bus; and
a backup power device comprising:
a backup battery pack;
a power converter coupled to the backup battery pack and the power bus; and
a processor coupled to the power supply device, the backup battery pack, and the power converter,
wherein the processor controls the backup battery pack and the power converter according to a current conversion efficiency of the power supply device, such that the backup battery pack performs switching to a charge mode or a discharge mode through the power converter, and
in response to the backup battery pack performing the discharge mode through the power converter, the backup battery pack and the power supply device simultaneously supply power through the power bus.

15. The power supply system according to claim 14, wherein the processor obtains a conversion efficiency point of the power supply device and determines the current conversion efficiency of the power supply device according to the conversion efficiency point, such that the backup battery pack performs switching to the charge mode or the discharge mode through the power converter.

16. The power supply system according to claim 15, wherein the processor sets a preset load electricity characteristic value according to the conversion efficiency point of the power supply device, obtains a current load electricity characteristic value corresponding to the power supply device, and compares the preset load electricity characteristic value and the current load electricity characteristic value, such that the backup battery pack performs switching to the charge mode or the discharge mode through the power converter.

17. The power supply system according to claim 14, wherein the processor obtains a conversion efficiency point of the power supply device and determines the current conversion efficiency of the power supply device according to a conversion efficiency interval corresponding to the conversion efficiency point, such that the backup battery pack performs switching to the charge mode or the discharge mode through the power converter.

18. The power supply system according to claim 14, wherein in response to the backup battery pack performing the charge mode through the power converter, the backup battery pack is charged through a power provided by the power supply device to the power bus.

19. The power supply system according to claim 14, wherein the power converter comprises:
a charging converter coupled to the backup battery pack; and
a discharging converter coupled to the backup battery pack,
wherein in response to the backup battery pack performing the discharge mode through the power converter, the processor controls the discharging converter and disables the charging converter, such that the backup battery pack supplies power through the power bus, and in response to the backup battery pack performing the charge mode through the power converter, the processor controls the charging converter and disables the discharging converter, such that the backup battery pack is charged through a power provided by the power supply device to the power bus.

* * * * *